(12) United States Patent
Rest et al.

(10) Patent No.: US 12,555,072 B2
(45) Date of Patent: Feb. 17, 2026

(54) FLEXIBLE MOBILE FULFILMENT SYSTEM, APPARATUS, AND METHOD

(71) Applicant: INTELLIGRATED HEADQUARTERS, LLC, Mason, OH (US)

(72) Inventors: Adam Rest, Pittsburgh, PA (US); Sai Prasanth Krishnamoorthy, Cranberry Township, PA (US)

(73) Assignee: Intelligrated Headquarters, LLC, Mason, OH (US)

( * ) Notice: Subject to any disclaimer, the term of this patent is extended or adjusted under 35 U.S.C. 154(b) by 287 days.

(21) Appl. No.: 18/155,920

(22) Filed: Jan. 18, 2023

(65) Prior Publication Data
US 2024/0242175 A1 Jul. 18, 2024

(51) Int. Cl.
*G06Q 10/087* (2023.01)

(52) U.S. Cl.
CPC .................. *G06Q 10/087* (2013.01)

(58) Field of Classification Search
CPC ...... G06Q 10/087; B65G 1/10; B65G 1/1371; B65G 1/1378; B65G 35/00; B65G 43/08; B65G 47/902
USPC ......................................................... 705/28
See application file for complete search history.

(56) References Cited

U.S. PATENT DOCUMENTS 11,230,441 B2 1/2022 Donlon et al.
11,276,026 B2 3/2022 Dubois et al.
11,939,156 B1 * 3/2024 Kalm ..................... B65G 61/00
2009/0267322 A1 * 10/2009 Holtan ................... B62B 5/0079
280/478.1

(Continued)

FOREIGN PATENT DOCUMENTS

DE 102012016522 A1 * 3/2013 ........... B65G 1/1378
EP 2948821 A1 12/2015
(Continued)

OTHER PUBLICATIONS

Honeywell Intelligrated, "The Put Wall: Versatile Facilitator of Omnichannel Distribution," White Paper, REV1 12.18:1-5, (2018). [Retrieved from the Internet Feb. 24, 2023: <URL: https://sps.honeywell.com/content/dam/honeywell-edam/sps/igs/en-us/support/resources/white-papers/sps-igs-put-wall-versatile-vacilitator-omnichannel-distribution-white-paper.pdf>].

(Continued)

*Primary Examiner* — Russell S Glass
(74) *Attorney, Agent, or Firm* — Alston & Bird LLP

(57) ABSTRACT

Methods, apparatuses, systems, computing devices, and/or the like are provided for an example fulfilment system. An example fulfilment system may include a flexible wall including a plurality of storage units; one or more connection mechanisms configured to operably connect the plurality of storage units such that each storage unit of the plurality of storage units is configured to be positioned relative to at least one other storage unit of the plurality of storage units; and a positioning device operably connected to the flexible wall, wherein the positioning device is configured to manipulate the flexible wall into one or more rows. In some embodiments, the flexible wall may be arranged such that the one or more rows have a variety of orientations, including a straight angled line, a right angled line, an acute angled line, an obtuse angled line, and a simple curved line. The storage units may have wheeled bases.

16 Claims, 14 Drawing Sheets

(56) References Cited

U.S. PATENT DOCUMENTS

2021/0380338 A1\* 12/2021 Dugat ................... B65G 1/10
2022/0234825 A1    7/2022 Krishnamoorthy et al.

FOREIGN PATENT DOCUMENTS

WO  WO-2014116947 A1 \*  7/2014  ........... B65G 1/1378
WO  WO-2015164264 A1 \* 10/2015  ........... G06Q 10/083

OTHER PUBLICATIONS

Extended European Search Report Mailed on May 2, 2024 for EP Application No. 23215478, 8 page(s).
EP Office Action Mailed on Apr. 8, 2025 for EP Application No. 23215478, 4 page(s).

\* cited by examiner

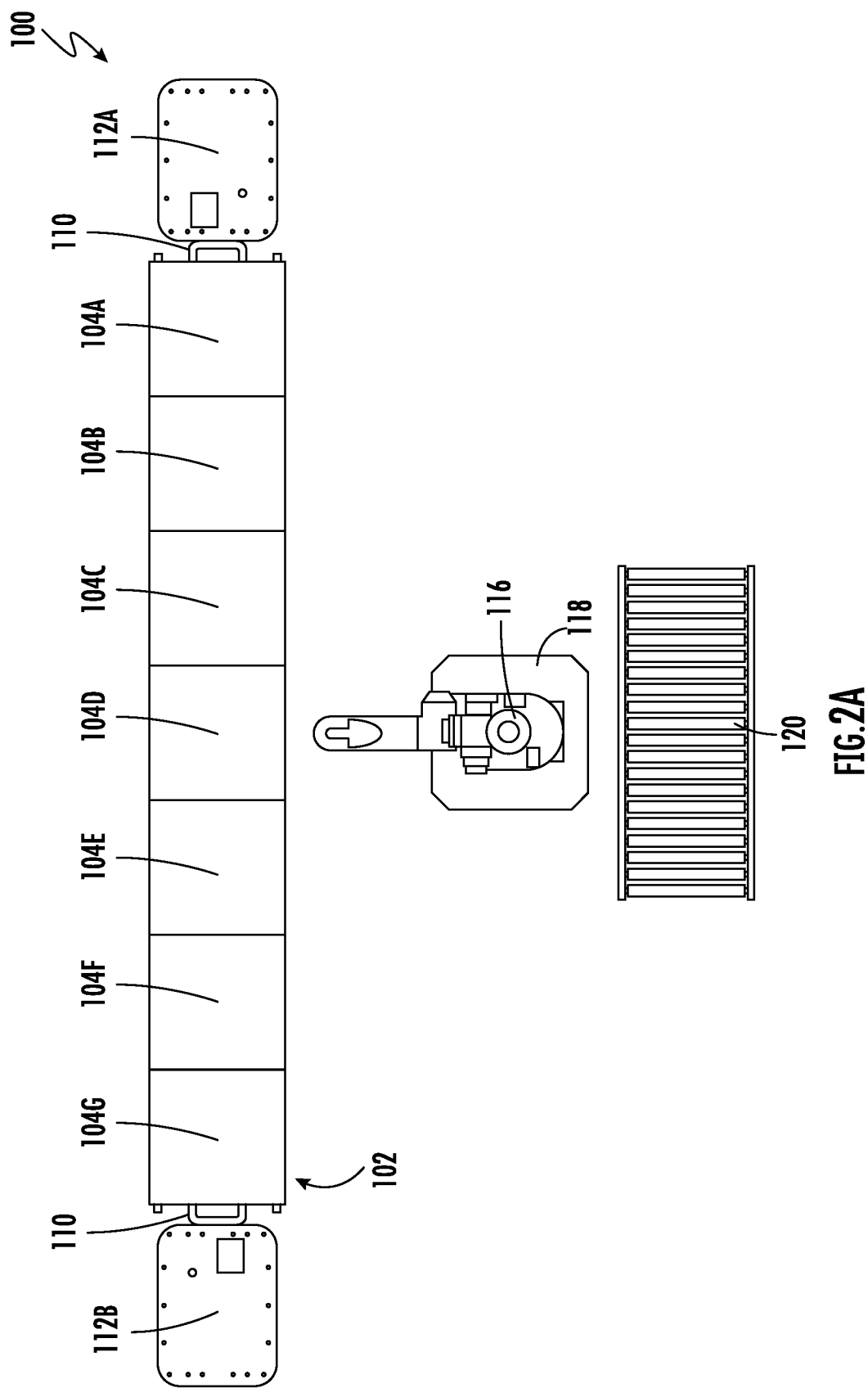

FLEXIBLE MOBILE FULFILMENT SYSTEM, APPARATUS, AND METHOD

TECHNICAL FIELD

The present disclosure relates generally to fulfilment systems, and more particularly to flexible and/or mobile walls used in fulfilment systems.

BACKGROUND

Fulfilment systems may be used in modern distribution environments to efficiently process orders for packaging by collecting a variety of orders within a centralized location for easy access by human or machine operators. A fulfilment system may include one or more means for collecting and storing a variety of totes for packaging. For example, a fulfilment system may include one or more totes that store a variety of objects, and the system may also include one or more storage walls having one or more slots for supporting the totes.

Increasing the size of the fulfilment system may increase distribution efficiency by enabling a greater and greater number of orders to be aggregated within a centralized location. However, simply increasing the length or height of the storage walls may cause a separate issue, where the storage walls are too long or too tall to be efficiently accessed by machine or human operators. For example, a longer storage wall allows for storage of more totes (and, by extension, more orders for packaging), but it also requires the human or machine operators to traverse the extended length of the wall to collect the orders from the totes.

Through applied effort, ingenuity, and innovation, Applicant has solved problems relating to inefficient fulfilment systems by developing solutions embodied in the present disclosure, which are described in detail below.

BRIEF SUMMARY

In general, embodiments of the present disclosure provide methods, apparatuses, systems, computing devices, computing entities, and/or the like.

According to various embodiments, there is provided a fulfilment system including a flexible wall. In some embodiments, the flexible wall includes: a plurality of storage units; and one or more connection mechanisms configured to operably connect the plurality of storage units such that each storage unit of the plurality of storage units is configured to be positioned relative to at least one other storage unit of the plurality of storage units; and a positioning device operably connected to the flexible wall, wherein the positioning device is configured to manipulate the flexible wall into one or more rows.

In some embodiments, the one or more rows includes an orientation selected from a group consisting of a straight angled line, a right angled line, an acute angled line, an obtuse angled line, and a simple curved line.

In some embodiments, the positioning device is an autonomous mobile robot.

In some embodiments, the positioning device is a first positioning device, and the fulfilment system further includes a second positioning device, and the first positioning device is configured to engage the flexible wall at a first end of the flexible wall and the second positioning device is configured to engage the flexible wall at a second end of the flexible wall.

In some embodiments, each storage unit of the plurality of storage units includes a wheeled base.

In some embodiments, each connection mechanism of the one or more connection mechanisms is selected from a group consisting of one or more hinged mechanism, one or more tensioned cables, one or more magnets, and one or more latches.

In some embodiments, the one or more connection mechanisms are further configured to selectively lock the flexible wall into the one or more rows such that the flexible wall is a rigid wall when positioned into the one or more rows.

In some embodiments, the flexible wall further includes one or more handles, and the positioning device is configured to engage with the one or more handles of the flexible wall.

In some embodiments, the plurality of storage units includes a plurality of rectangular put walls.

In some embodiments, the fulfilment system includes a product picking device configured to engage with the plurality of storage units, wherein the product picking device has a range of motion including a spatial region from which the product picking device may engage with the plurality of storage units.

In some embodiments, the fulfillment system includes a platform on which the product picking device is at least partially disposed, wherein the platform includes an actuating mechanism configured to raise and lower the product picking device relative to the flexible wall.

In some embodiments, the fulfilment system further includes a controller configured to communicate with one or more of the product picking device and the positioning device, and wherein the controller is configured to send a signal to the positioning device to manipulate the flexible wall into the one or more rows such that the one or more rows conform to the spatial region of the product picking device.

In some embodiments, the fulfilment system further includes one or more totes disposed at least partially on the plurality of storage units.

In some embodiments, the product picking device is a robotic arm configured for six-axis motion.

In some embodiments, the system further includes a conveying device configured to support the one or more totes, and wherein the robotic arm is configured to selectively move the one or more totes between the plurality of storage units and the platform.

According to various embodiments, there is provided a method of using a fulfilment system, the fulfilment system including a flexible wall including a plurality of storage units; and one or more connection mechanisms configured to operably connect the plurality of storage units such that each storage unit of the plurality of storage units is configured to be positioned relative to at least one other storage unit of the plurality of storage units; a positioning device operably connected to the flexible wall, wherein the positioning device is configured to manipulate the flexible wall into one or more rows; and a product picking device configured to engage with the plurality of storage units, wherein the product picking device has a range of motion comprising a spatial region from which the product picking device may engage with the plurality of storage units. According to various embodiments, the method includes manipulating, by the positioning device, the flexible wall into the one or more rows including one or more orientations conforming to the spatial region from which the product picking device may engage with the plurality of storage units.

In some embodiments, the fulfilment system further includes one or more totes disposed at least partially on the plurality of storage units, and the method further includes removing, by the product picking device, the one or more totes from the plurality of storage units.

The above summary is provided merely for purposes of summarizing some example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 2A is an example top view of an example order processing system in accordance with some embodiments of the present disclosure;

DETAILED DESCRIPTION OF SOME EXAMPLE ASPECTS

Figure 1A:
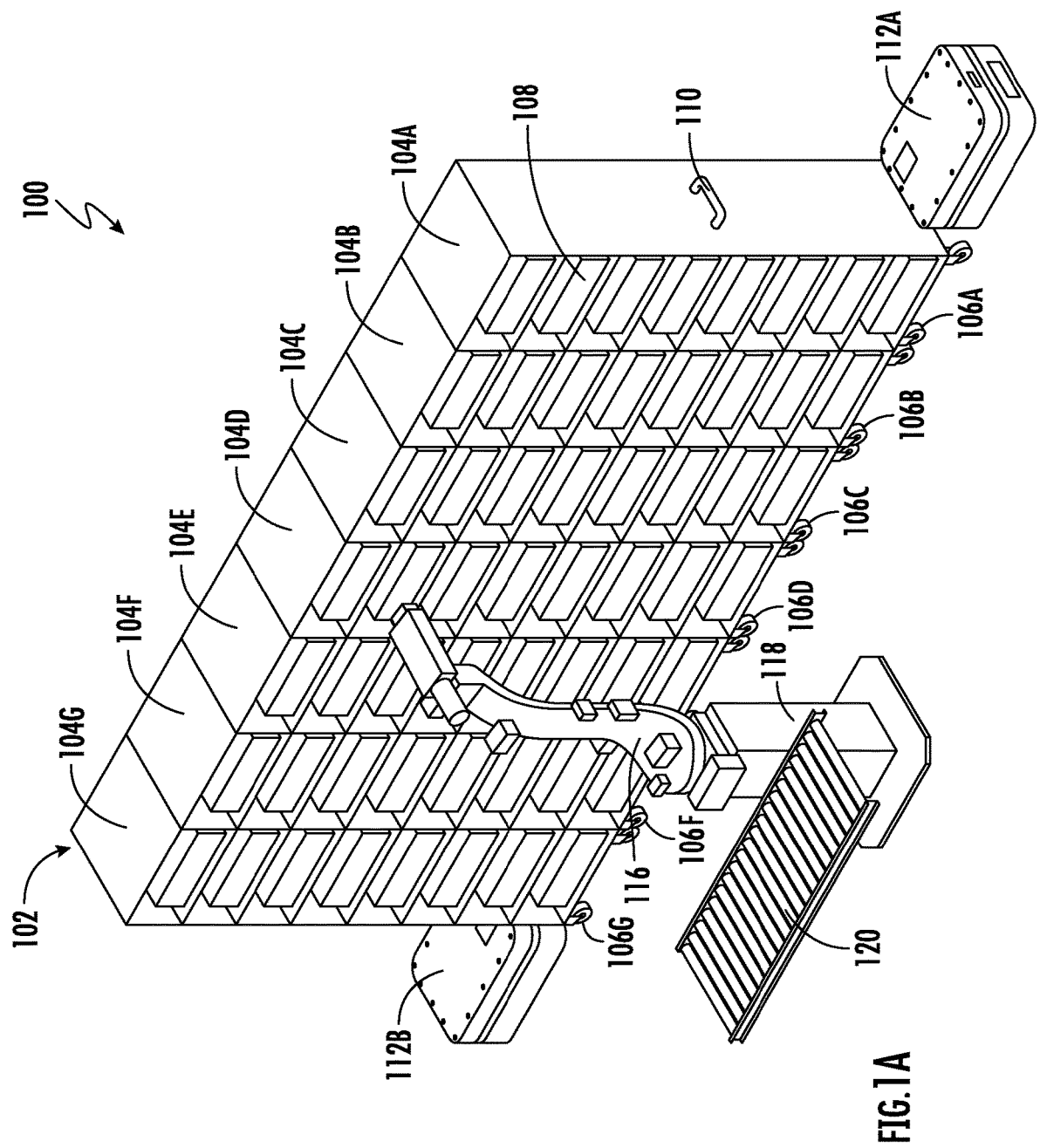
FIG. 1A is an example top angled view of an example order processing system in accordance with some embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same aspect).

Aspects of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where aspects are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, aspects of the present disclosure may take the form of a data structure, apparatus, system, computing device, computing entity, and/or the like executing instructions stored on a computer-readable storage medium to perform certain steps or operations. Thus, aspects of the present disclosure may also take the form of an entirely hardware aspect, an entirely computer program product aspect, and/or an aspect that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware aspect, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary aspects, retrieval, loading, and/or execution may be performed in parallel such that multiple instructions are retrieved, loaded, and/or executed together. Thus, such aspects can produce specifically-configured machines performing the steps or operations specified in the block diagrams and flowchart illustrations. Accordingly, the block diagrams and flowchart illustrations support various combinations of aspects for performing the specified instructions, operations, or steps.

Overview

A fulfilment system may include a flexible wall comprising one or more storage units for supporting one or more totes that contain a variety of objects for packaging and distribution. For a human or machine worker interacting with the flexible wall, one orientation for potentially maximizing the available workspace would be when the flexible wall is oriented in a partial circle in the horizontal plane limited by the reach of a human or machine (e.g., a 6 axis industrial robot) operator. To more fully utilize the reach of the operator in the horizontal space, a partial cylindrical flexible wall centered on the human or machine is desirable. This minimizes travel time, in some examples, between pick location and put destination in comparison to a flat wall that necessitates, in some examples, walking or linear actuation for locations outside of reach. However, a rigid partial vertical cylinder is space inefficient, in some examples, for facility storage at least for the reasons that the shape does not tesselate and is cumbersome to move.

Embodiments of the present disclosure include, in some examples, a fulfilment system having a flexible and mobile wall (such as a put wall) and one or more positioning devices. The wall comprises a plurality of storage units (e.g., rectangular prism walls having one or more slots for one or more totes) connected by one or more connection mechanisms (e.g., hinges). The connection mechanisms enable each storage unit to be positioned relative to the other. In at least this way, the wall is flexible because the units can be positioned such that the wall has one or more orientations. For example, the storage units may be positioned in a straight line, a curved line, a semicircle, and/or other geometric shape. The one or more positioning devices may be autonomous mobile robots that connect to one or more points on the wall (e.g., one or more handles). The storage units may include wheeled bases that allow the autonomous mobile robots to move the wall. In at least this way, the wall is mobile because the autonomous mobile robots may move the wall to various locations within a distribution center. However, the wall may also be moved by human operators or other automated or manual mechanisms, not merely by the autonomous mobile robots.

The fulfilment system may additionally include a product picking device such as a robotic arm configured for six-axis motion that may be disposed on a platform configured to raise and lower. This may allow for taller storage units that can store a greater number of totes and a greater number of objects for packaging.

The fulfilment system may also include a conveying device (e.g., a conveyor belt) that may support one or more objects. The product picking device (or, in some embodiments, simply a human operator) may take objects from the one or more totes in the one or more storage units and place them on the conveying device.

Various components of the fulfilment system, such as the positioning devices and the product picking device, may be controlled by a controller that may for example, send signals to the positioning devices to position the wall into one or more orientations relative to the product picking device.

Example Flexible Order Processing Systems

Figure 5:
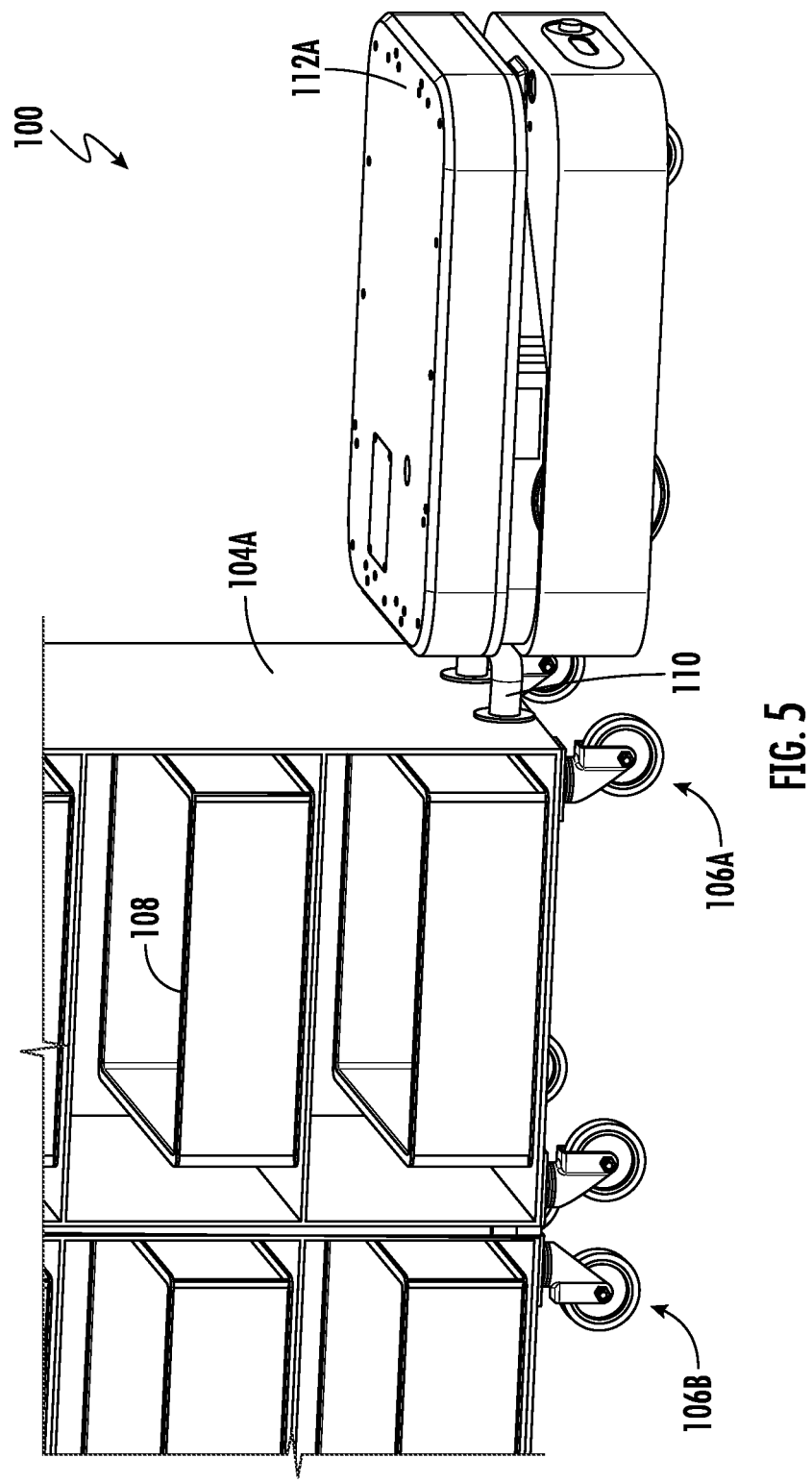
FIG. 5 is an example angled view of an example autonomous mobile robot of an example order processing system in accordance with some embodiments of the present disclosure.
Figure 6:
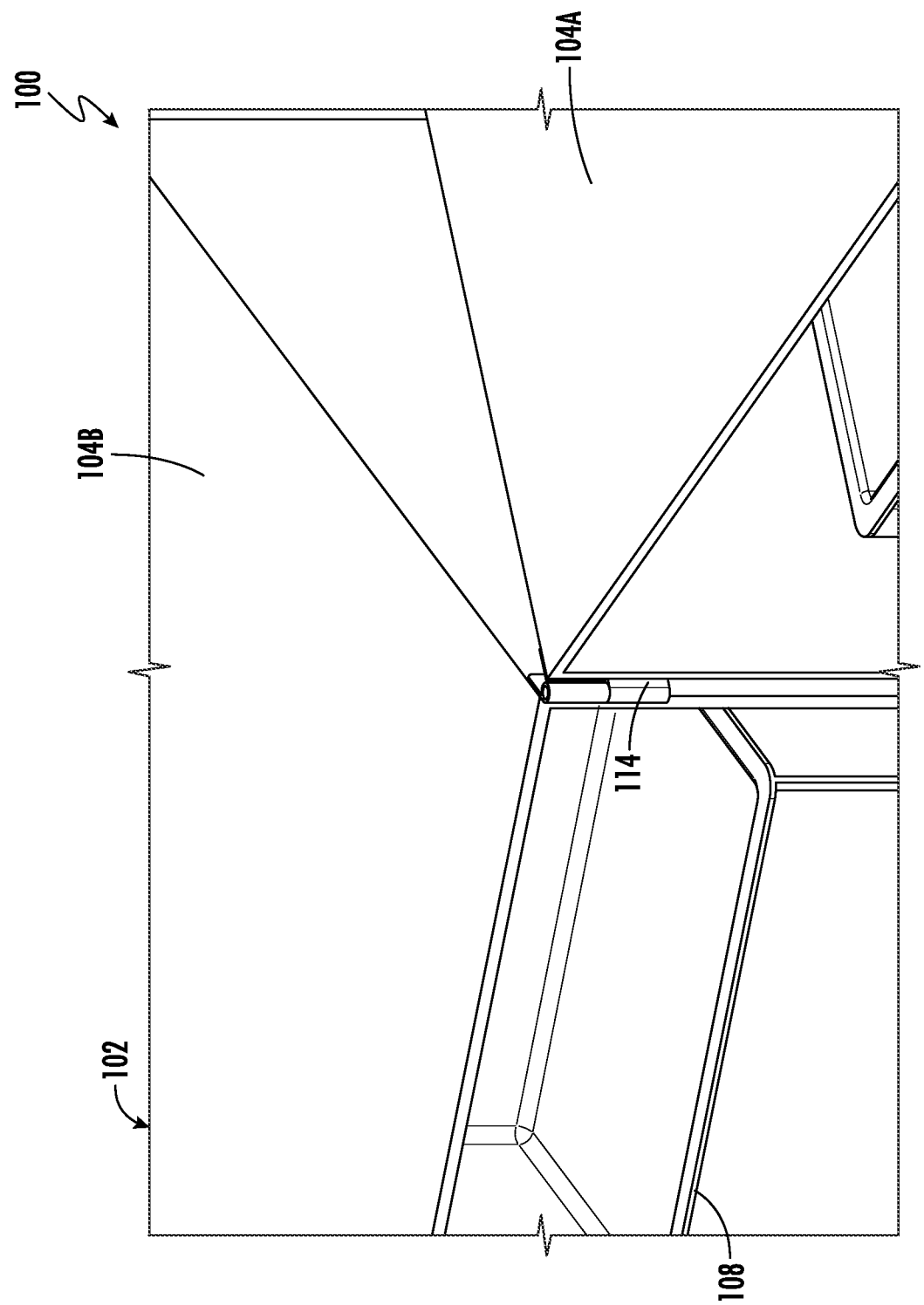
FIG. 6 is an example angled view of an example connection mechanism for an example order processing system in accordance with some embodiments of the present disclosure.
Figure 7:
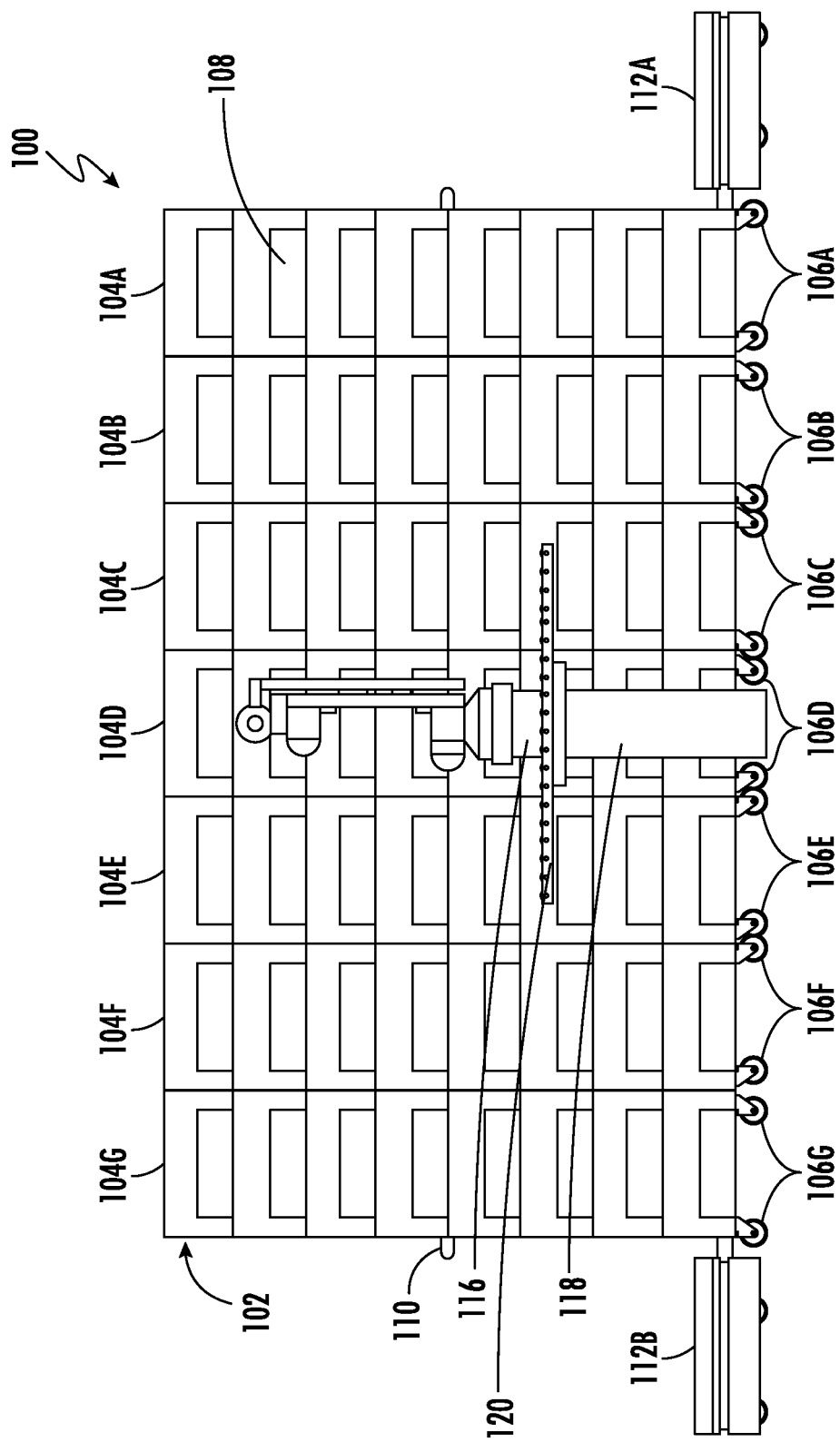
FIG. 7 is an example front elevation view of an example order processing system in accordance with some embodiments of the present disclosure.
Figure 8:
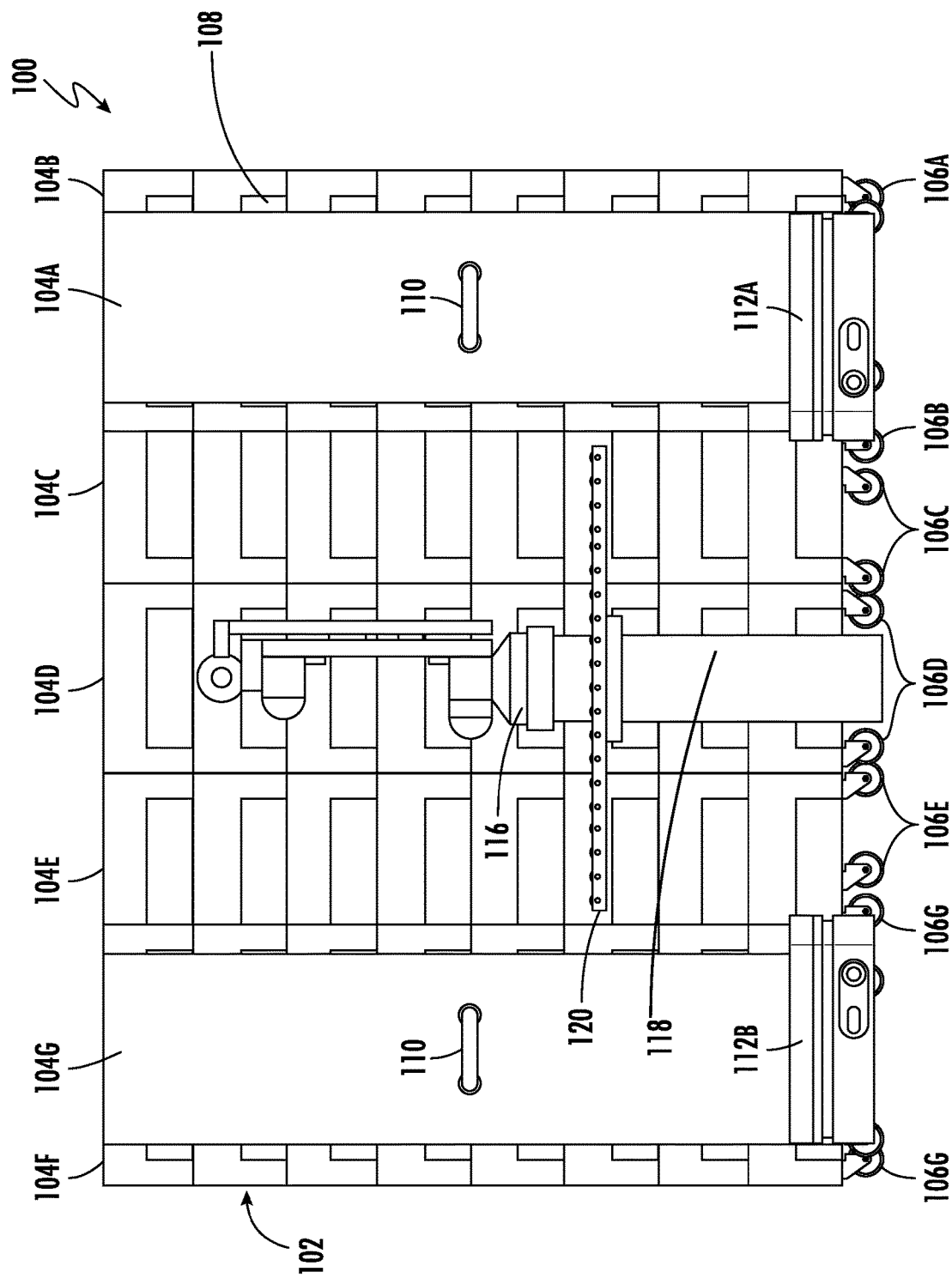
FIG. 8 is an example front elevation view of an example order processing system in accordance with some embodiments of the present disclosure.
Figure 9:
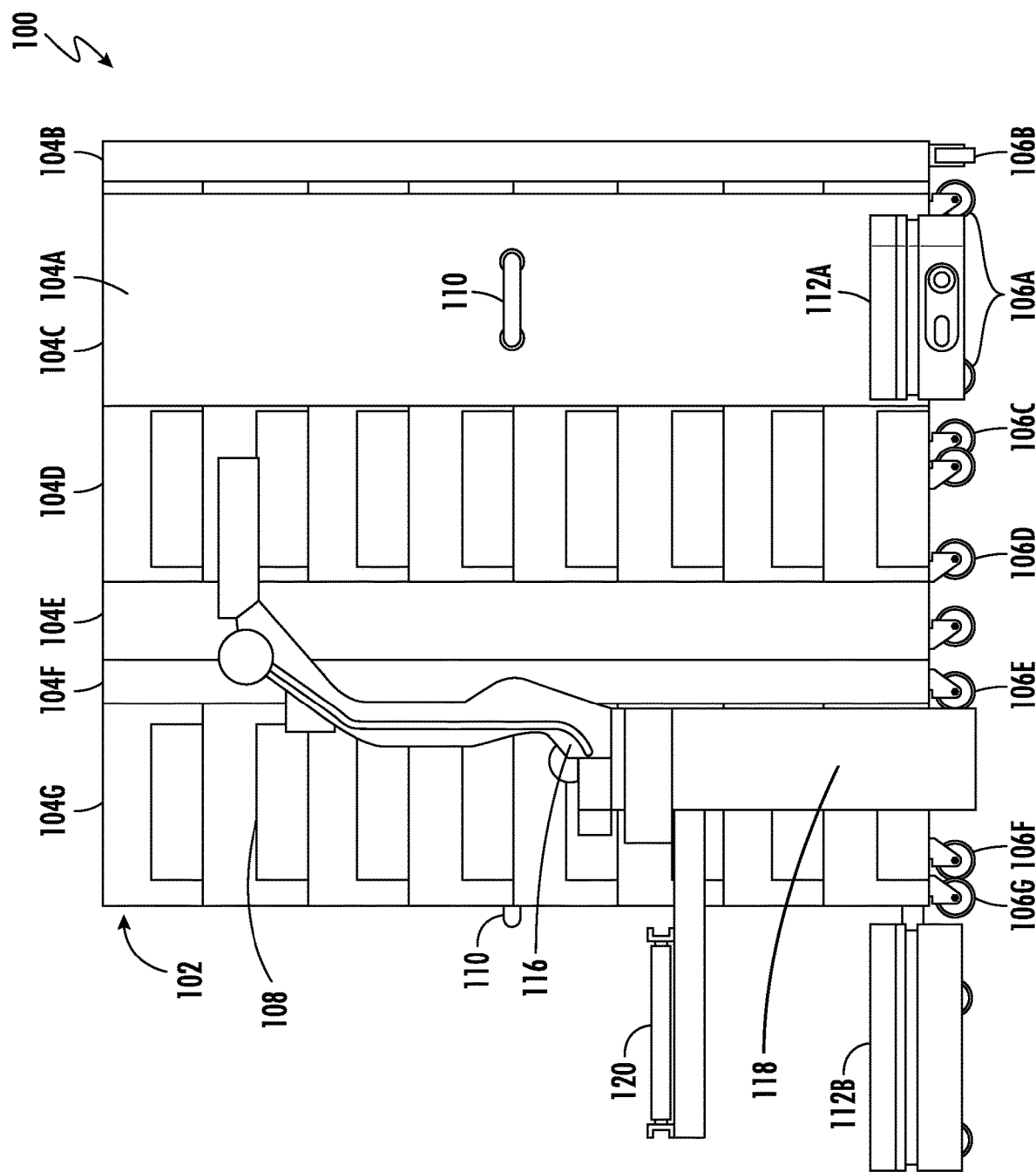
FIG. 9 is an example side elevation view of an example order processing system in accordance with some embodiments of the present disclosure.

The associated figures show various views of an example fulfilment system 100, with FIGS. 1A-4B and 7-9 showing the whole system 100 according to various embodiments, and FIGS. 5 and 6 showing detailed views of example aspects of the system 100 according to various embodiments.

Referring now to FIGS. 1A-4B and 7-9, in some embodiments, the system 100 may include an example flexible wall 102. In some embodiments, the flexible wall 102 may include a plurality of storage units 104A, 104B, 104C, 104D, 104E, 104F, and 104G. Though seven storage units are shown in FIG. 1A, it will be understood that greater or fewer than seven storage units 104A-G may be used, according to various embodiments.

In some embodiments, the storage units 104A-G in the flexible wall 102 may be arranged into one or more rows having one or more orientations. FIGS. 1A, 1B, 2A, and 2B show the flexible wall 102 in a row having the orientation of a straight angled line. FIGS. 3A, 3B, 4A, and 4B show the flexible wall 102 having the orientation of a simple curved line. In other embodiments, the flexible wall 102 may be arranged into an orientation having right-angled, acute-angled, or obtuse-angled line, depending on the needs of the system 100. In some embodiments, the flexible wall 102 may have one or more orientations; that is, the flexible wall 102 may have one or more storage units 104A-G having an orientation of a straight angled line, while one or more other storage units 104A-G have an orientation of a right-angled line.

In some embodiments, the storage units 104A-G may be rectangular put walls, as shown in the various figures. However, in other embodiments, the storage units 104A-G may take on various different shapes, such as a cylinder. In some embodiments, the flexible wall 102 may include storage units 104A-G all of the same configuration (e.g., all rectangular), while in other embodiments the flexible wall 102 may have a heterogeneous configuration of storage units 104A-G (e.g., some units are rectangular, others are cylindrical, and still others are prisms).

In some embodiments, the storage units 104A-G may each include a respective wheeled base 106A-G allowing the storage units 104A-G to be moved via their respective wheeled bases 106A-G around a warehouse or other industrial space. In some embodiments, the wheeled bases 106A-G may include locking mechanisms (e.g., one or more latches) such that the storage units 104A-G can no longer be moved via the wheeled bases 106A-G when the locking mechanisms are engaged; that is, the locking mechanisms in the wheeled bases 106A-G may prevent the wheeled bases from rotating or translating in any way. In some embodiments, the wheeled bases 106A-G may be integrated into their respective storage units 104A-G, while in other embodiments the wheeled bases may be fixedly or operably attached to their respective storage units 104A-G.

In some embodiments, one or more totes 108 may be supported by the one or more storage units 104A-G. In some embodiments, the one or more totes 108 may include one or more items for packaging and distribution. In some embodiments, the one or more totes 108 may be supported in various slots (e.g., cubbies) of the one or more storage units 104A-G.

In some embodiments, and as shown in at least FIG. 5, the system 100 may include one or more handles 110. In some embodiments, the handles 110 may be fixedly attached to one or more storage units 104A-G of the flexible wall 102. In some embodiments, the handles 110 may be fixedly attached to or integrated with a storage unit (e.g., 104A) and positioned such that an operator (human or machine) could grip the handle 110 and use the handle 110 (e.g., pull on the handle) to thereby pull on the flexible wall 102 and either move the flexible wall 102 or change the orientation of the flexible wall 102. As shown in FIG. 5, handles 110 may be positioned at a variety of heights on the flexible wall 102, and more than one handle 110 may be fixedly attached to or integrated with the wall to allow for different methods of moving and reorienting the flexible wall 102.

In some embodiments, the system 100 may include one or more positioning devices 112A and 112B. Though two positioning devices 112A and 112B are shown in the various figures, it will be understood that greater or fewer than two positioning devices 112A, 112B may be used depending on the needs of the system 100. In some embodiments, the one or more positioning devices 112A, 112B may be autonomous mobile robots (AMRs). In some embodiments, the positioning devices 112A, 112B may include one or more actuating grips and may be configured to connect to the one or more handles 110 (as shown in at least FIG. 5) of the system 100. In some embodiments, the positioning devices 112A, 112B may grip the one or more handles 110 of the system 100 and, having thereby secured a connection to the flexible wall 102, may move the flexible wall 102 and the storage units 104A-G into a variety of orientations. In some embodiments, multiple positioning devices 112A, 112B may be used to move and reorient the flexible wall 102, but in other embodiments only a single positioning device 112A may be used. In some embodiments, the one or more positioning devices 112A, 112B may be used in conjunction with a human or machine operator. For example, an AMR 112A may move the flexible wall 102 into a certain position within a distribution center (e.g., a centralized location, or a location in close proximity to a product picking device, as will be described in greater detail later), and then a human operator may reorient the flexible wall 102 into one or more orientations (e.g., into a semi-circle). In other embodiments, the positioning devices 112A, 112B may perform both the tasks of moving the flexible wall 102 and reorienting the flexible wall 102. For example, an AMR 112A may move the flexible wall 102 into a position, and then that same AMR 112A or a separate AMR 112B may reorient the flexible wall 102 (or the AMRs 112A, 112B may work in conjunction to move and/or reorient the wall).

In some embodiments, the storage units 104A-G may be connected by one or more connection mechanisms 114, as shown in at least FIG. 6. In some embodiments, the connection mechanisms 114 may operably connect the storage units 104A-G such that each storage unit 104A-G may be positioned relative to each other. For example, the storage unit 104A may be operably connected to the storage unit 104B such that the storage unit 104A may be pivoted to a 45 degree angle relative to storage unit 104B, while storage unit 104B may be concurrently pivoted to a 30 degree angle relative to storage unit 104C. In some embodiments, the connection mechanisms 114, in addition to allowing each storage unit 104A-G to move relative to the other, may also be configured to lock the storage units 104A-G into position. Returning to the previous example, once the storage unit 104A has been pivoted to a 45 degree angle relative to storage unit 104B, the connection mechanism 114 may be locked to essentially "fix" the storage unit's 104A position relative to the other storage unit 104B. In at least this way, the flexible wall 102 may be configured to one or more rows having one or more orientations through the pivoting and reorienting of the storage units 104A-G relative to each other.

In some embodiments, the one or more connection mechanisms 114 may be hinge mechanisms (as shown in at least FIG. 6), one or more tensioned cables, one or more magnets, and one or more latches. In some embodiments, the one or more connection mechanisms 114 may all be the same type of connection mechanism 114 (e.g., the storage units may all be connected by hinge mechanisms), while in other embodiments, the one or more connection mechanisms 114 may be a mixture of the various connection mechanisms 114 (e.g., some storage units may be connected by hinge mechanisms while others are connected by tensioned cabled and still others are connected by magnets). In some embodiments, the connection mechanisms 114 may be configured to selectively lock and unlock, either by human interaction or through a controller, and in so doing make the flexible wall 102 rigid (when the mechanisms 114 are locked) or flexible (when the mechanisms 114 are unlocked).

Figure 1B:
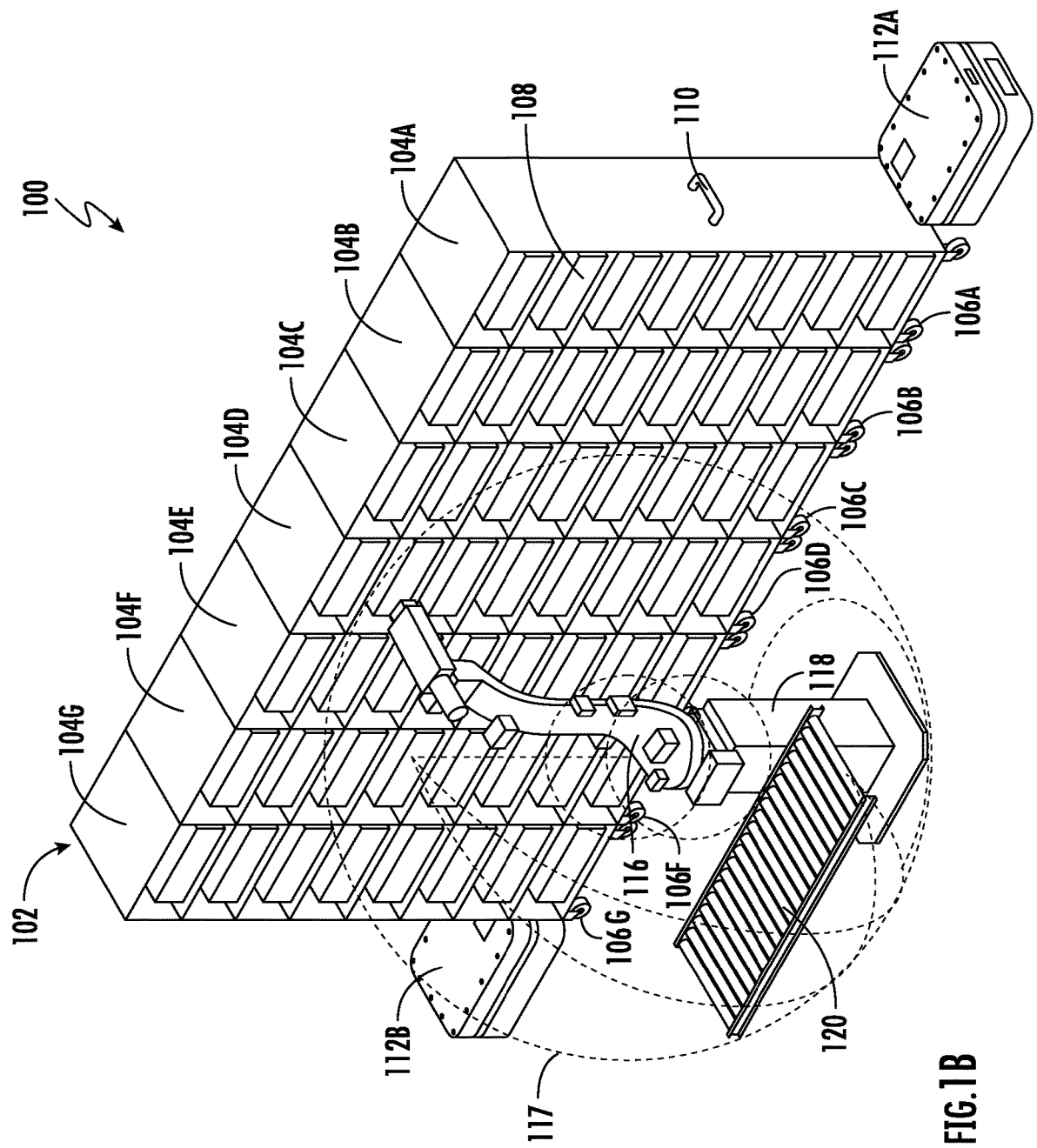
FIG. 1B is an example top angled view of an example order processing system in accordance with some embodiments of the present disclosure.
Figure 2B:
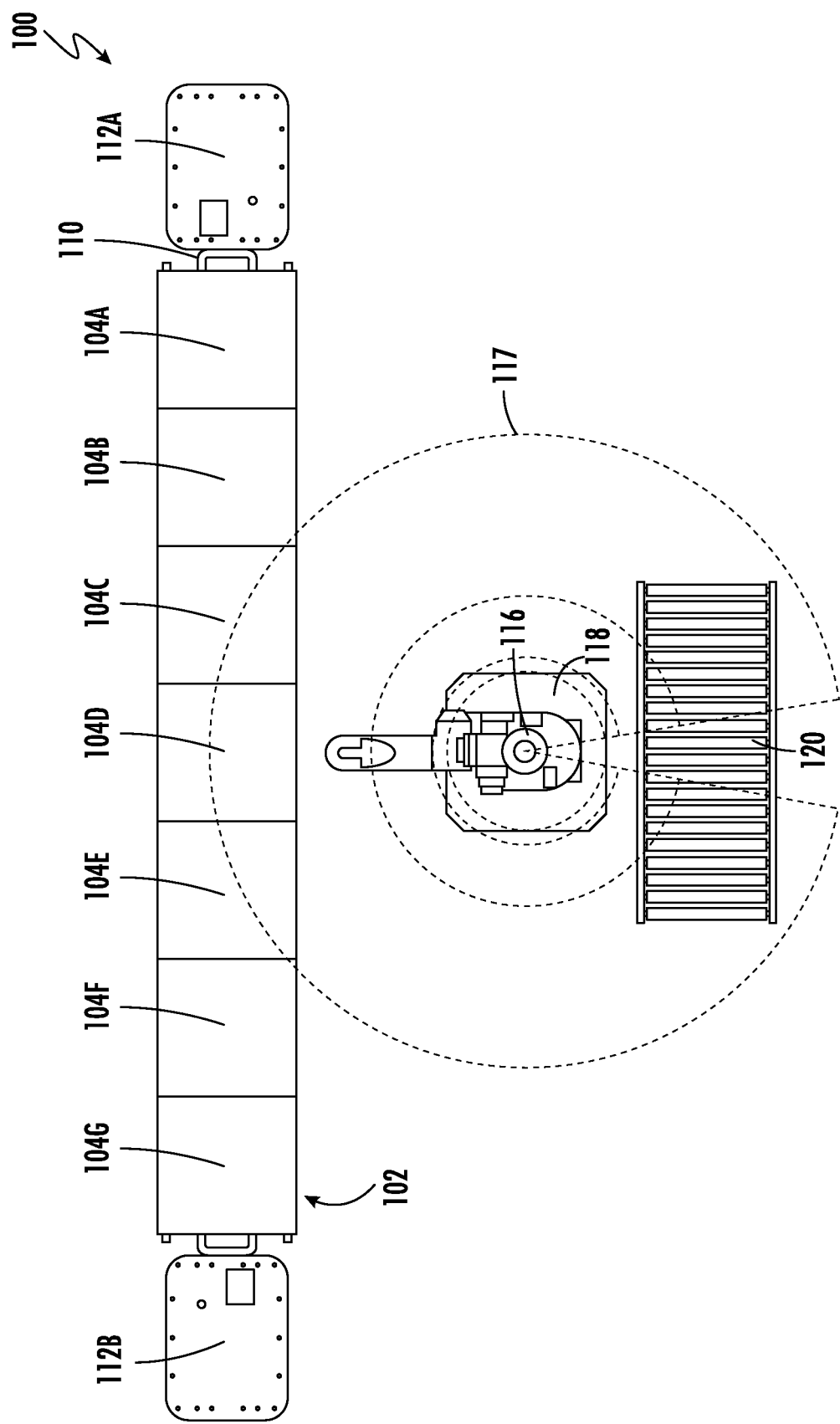
FIG. 2B is an example top view of an example order processing system in accordance with some embodiments of the present disclosure.
Figure 3A:
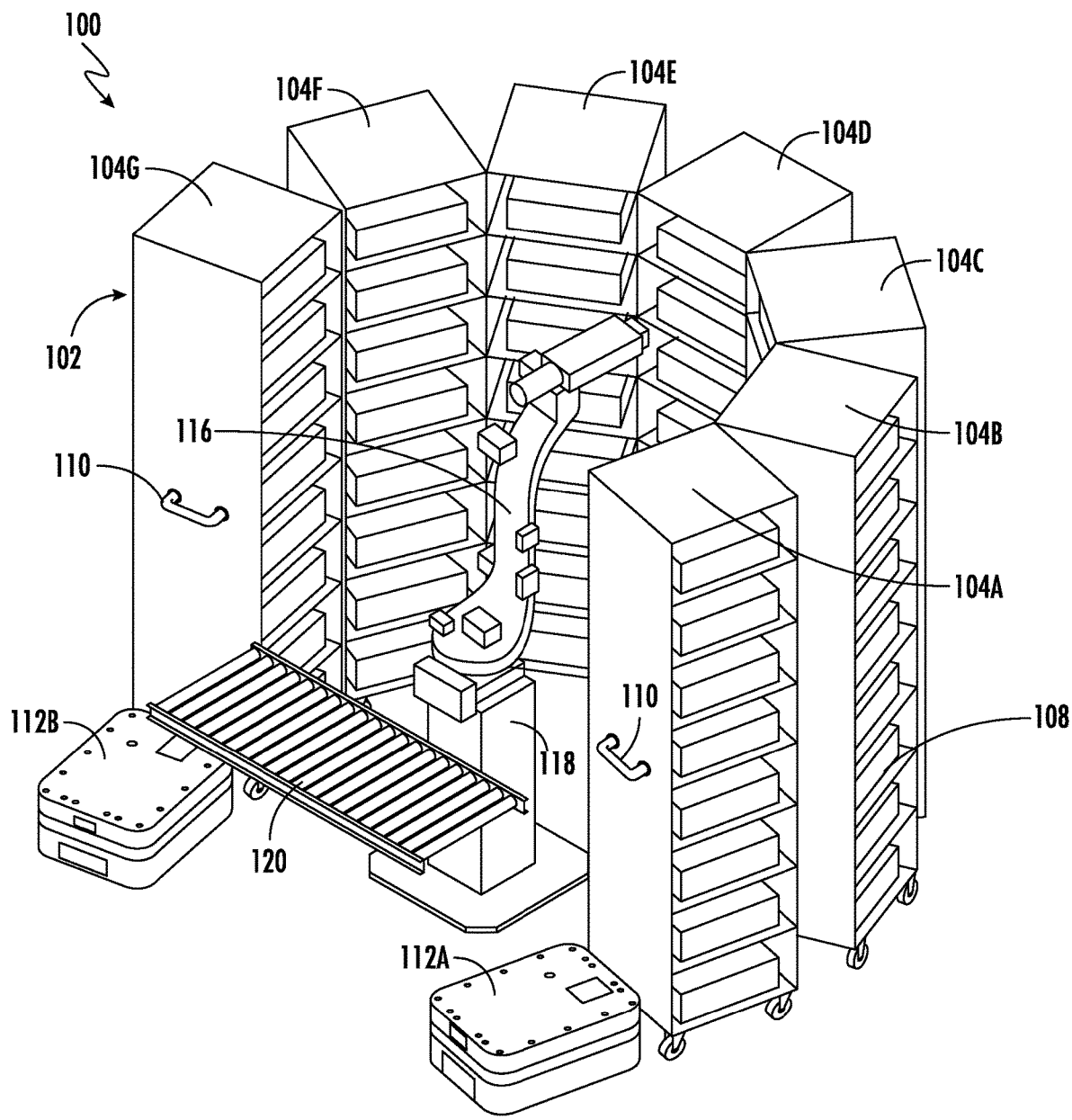
FIG. 3A is an example top angled view of an example order processing system in accordance with some embodiments of the present disclosure.
Figure 3B:
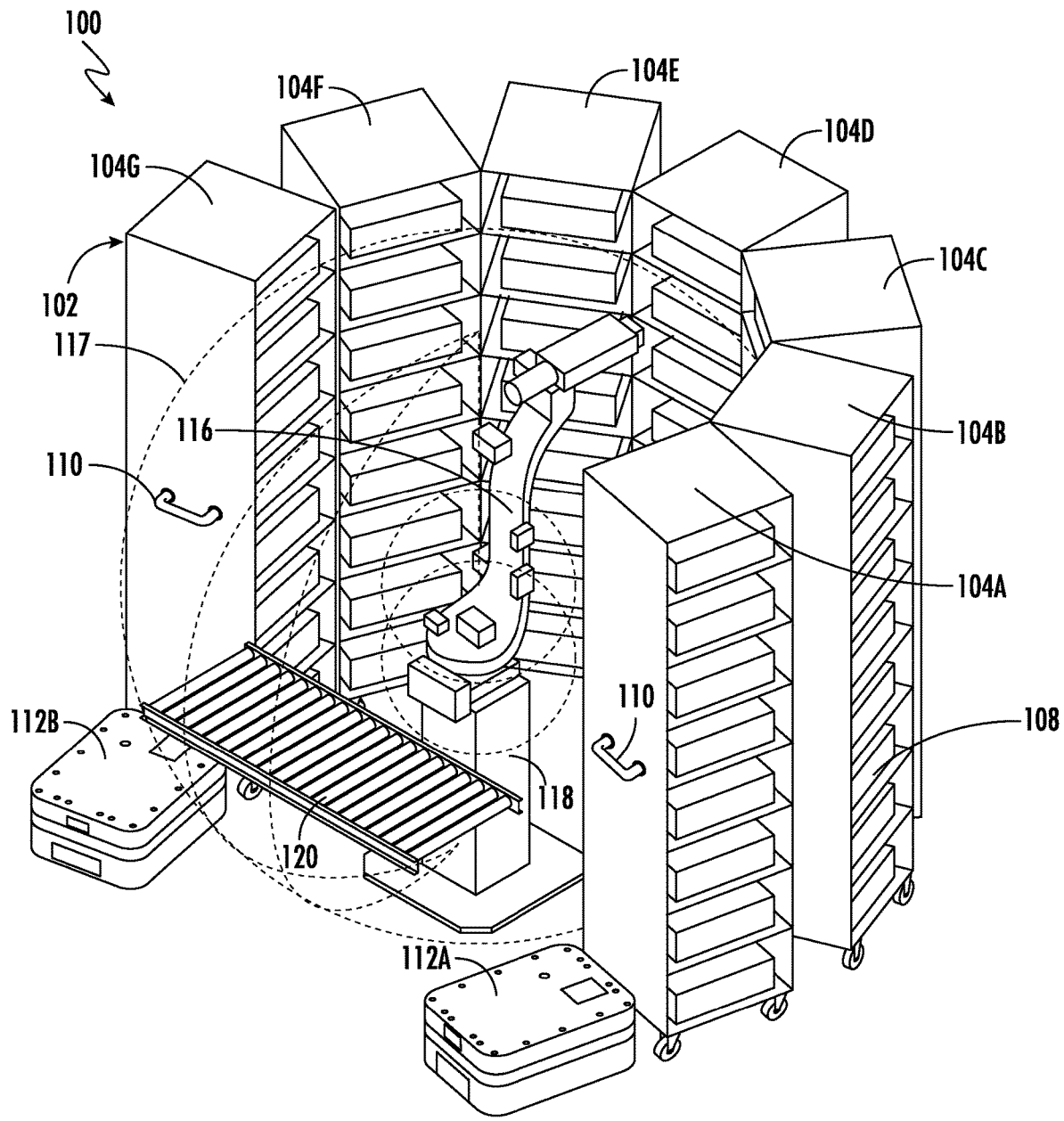
FIG. 3B is an example top angled view of an example order processing system in accordance with some embodiments of the present disclosure.
Figure 4A:
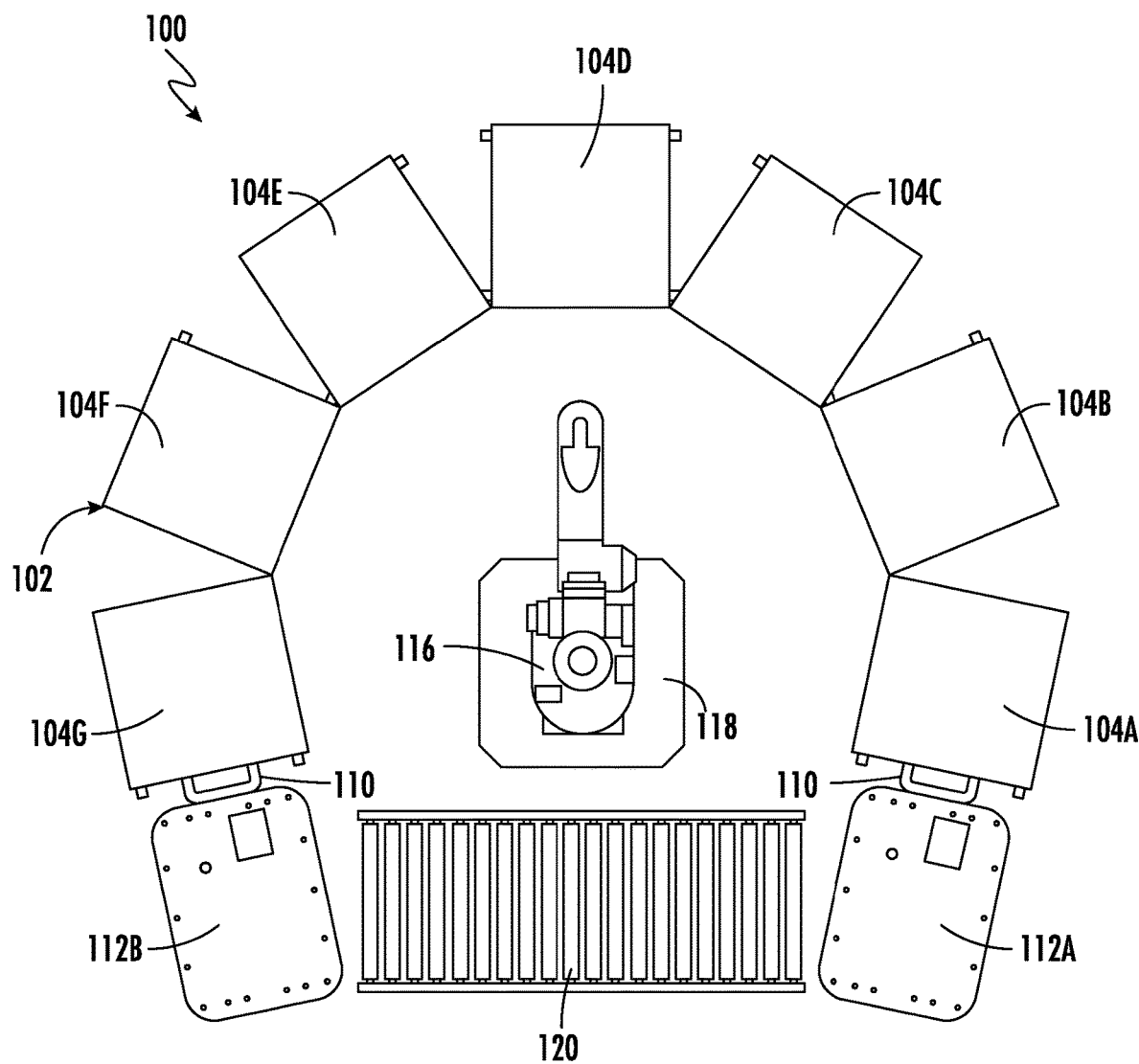
FIG. 4A is an example top view of an example order processing system in accordance with some embodiments of the present disclosure.
Figure 4B:
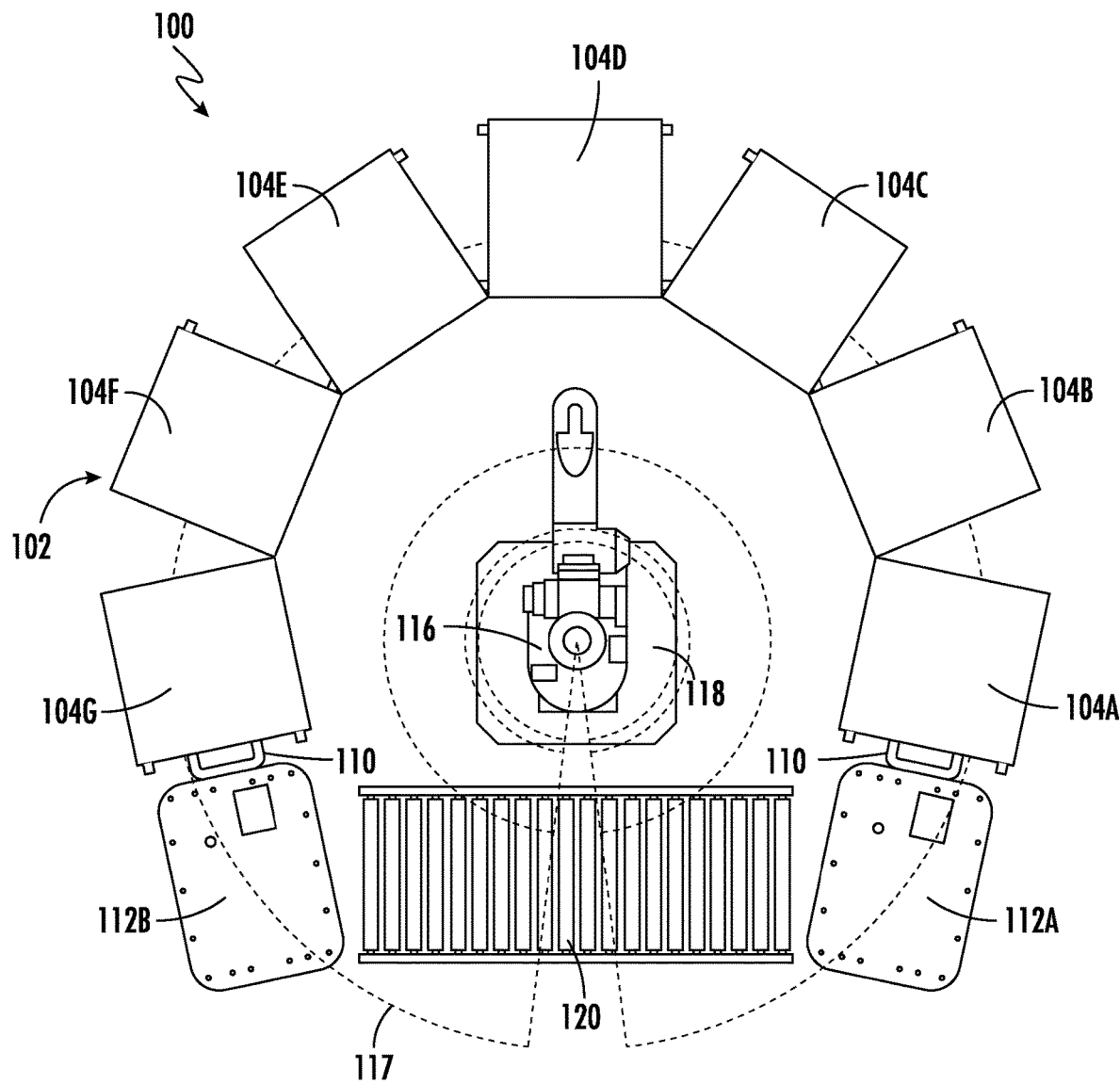
FIG. 4B is an example top view of an example order processing system in accordance with some embodiments of the present disclosure.

In some embodiments, and as previously alluded to, the system 100 may include a product picking device 116. In some embodiments, the product picking device 116 may be a robotic arm configured for six-axis motion. Alternatively or additionally, the product picking device 116 may take the form of a robot that is configured to traverse the structure whereas in other examples, multiple product picking devices 116 may be used to obtain, dig, or otherwise obtain one or more one or more items from the flexible wall 102. In some embodiments, the product picking device 116 may be configured to select one or more totes 108 from one or more storage units 104A-G of the flexible wall 102. In some embodiments, the product picking device 116 may have a range of motion, as shown in at least FIGS. 1B, 2B, 3B, and 4B, that may include a spatial region 117 from which the product picking device 116 may engage with the plurality of storage units 104A-G. In some embodiments, the one or more storage units 104A-G may be oriented such that the spatial region 117 of the product picking device 116 encapsulates an optimal amount of the flexible wall 102. For example, as shown in FIG. 1B, the spatial region 117 does not extend to at least all of the totes 108 in the units 104A, 104B, 104 F, and 104G because the flexible wall 102 is oriented in a straight angled line. However, as another example, in FIG. 3B, the flexible wall 102 is oriented in a semi-circle around the product picking device 116, such that the range of motion extends to more totes 108 in the flexible wall 102 than it did in FIG. 1B. In some embodiments, the one or more positioning devices 112A, 112B may move and/or orient the flexible wall 102 such that the one or more storage units 104A-G are encapsulated within the spatial region 117. For example, the one or more storage units 104A-G may move the flexible wall 102 into close proximity with the product picking device 116 and then orient the flexible wall 102 into a semi-circle around the device 116, as shown in at least FIGS. 3B and 4B.

In some embodiments, the product picking device 116 may be positioned on a platform 118 that may be fixed to the floor of an example distribution center or other facility. In some embodiments, the product picking device 116 may be fixed to or integrated with the platform 118. In other embodiments, the product picking device 116 may be operably connected to the platform 118 and may be removed as necessary for the system 100 (e.g., a different device could be placed on the platform 118, or a human operator could stand on the platform). In some embodiments, the platform 118 may include one or more actuating mechanisms that may be configured to raise and lower the platform 118, enabling the product picking device 116 to reach higher and lower positions, respectively, on the flexible wall 102.

In some embodiments, the system 100 may include a conveying device 120, which may be positioned adjacent to the product picking device 116 and/or the platform 118. In some embodiments, the conveying device 120 may be a conveyor belt connected to one or more other conveyor belts within a distribution center. In some embodiments, the conveying device 120 may be fixed to the floor of an example distribution center, but in other embodiments the conveying device 120 may be integrated into the product picking device 116 and/or supported by the platform 118. In some embodiments, the conveying device 120 may be configured to support one or more totes 108 (or one or more objects contained within the totes 108). In some embodiments, the conveying device 120 may be configured to move the totes 108 and/or objects within the totes throughout the distribution center. In some embodiments, the product picking device 116 may be configured to remove the totes 108 or objects within the totes from the flexible wall 102 and place them on or proximate to the conveying device 120. In other embodiments, the product picking device 116 may remove totes 108 or objects from the conveying device 120 and place them within storage units 104A-G of the flexible wall 102.

In some embodiments, various components of the system 100 may be controlled by a controller. In some embodiments, one or more of the positioning devices 112A, 112B, the product picking device 116, and the one or more actuating mechanisms of the platform 118 may be controlled by the controller, which may be configured to communicate with one or more of the positioning device 112A, 112B, the product picking device 116, and the one or more actuating mechanisms of the platform 118. In some embodiments, the controller may be configured to send one or more signals to the positioning devices 112A, 112B, the product picking device 116, and/or the actuating mechanisms of the platform 118. For example, the controller may send a signal to a positioning device 112A to manipulate the flexible wall 102 into one or more rows having an orientation that conforms to the spatial region 117 of the product picking device 116. In some embodiments, the controller may include hardware and software components. In some embodiments, the controller may include one or more processors configured to implement the aforementioned example, as well as additional, similar examples for controlling the various components of the system 100. In some embodiments, the one or more processors may be computer processing units (CPUs). In some embodiments, the controller may interact with a server containing instructions for the one or more processors to carry out various functions of one or more of the positioning devices 112A, 112B, the product picking device 116, and/or the actuating mechanisms of the platform 118.

Example Method of Using an Order Processing System

Figure 10:
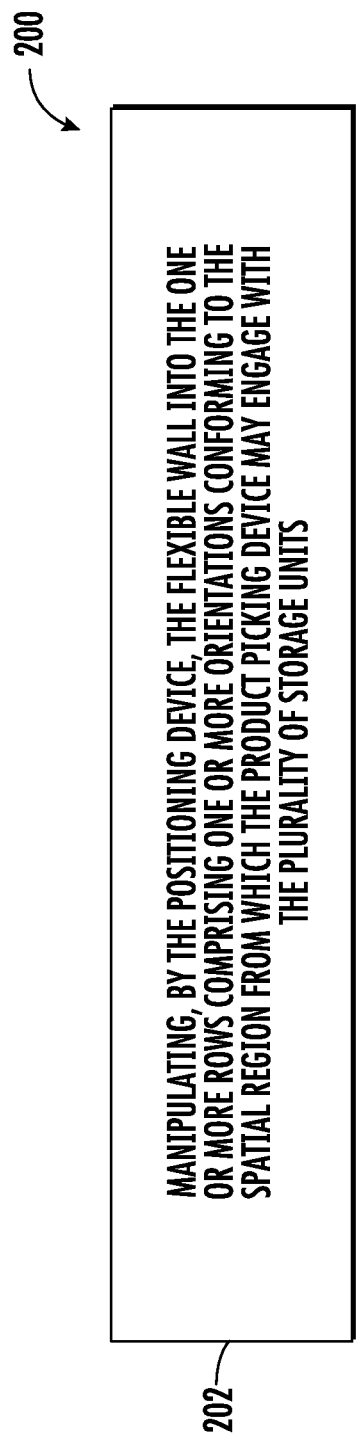
FIG. 10 is an example flow chart of an example method of use for an example order processing system in accordance with some embodiments of the present disclosure.

FIG. 10 is an example flow diagram illustrating an example method 200 of using a fulfilment system in accordance with various embodiments of the present disclosure. In some embodiments, the example flow diagram illustrated in FIG. 10 is performed in reference to the systems and various components shown in the various embodiments of at least FIGS. 1-9. However, it will be understood that the method 200 may be performed with respect to other suitable systems and components not described in this disclosure.

According to various embodiments, a method 200 of using a fulfilment system may include a step 202 of manipulating, by the positioning device, the flexible wall into one or more rows have one or more orientations conforming to the spatial region from which the product picking device may engage with the plurality of storage units. In some embodiments, the method 200 may include an additional step of removing, by the product picking device, the one or more objects from the plurality of storage units.

In some embodiments, the steps of the method 200 may be implemented using the controller and the one or more processors previously described in this disclosure.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

The invention claimed is:

1. A fulfilment system comprising:
a flexible wall comprising:
a plurality of storage units;
one or more connection mechanisms configured to operably connect the plurality of storage units such that each storage unit of the plurality of storage units is configured to be positioned relative to at least one other storage unit of the plurality of storage units; and
a positioning device operably connected to the flexible wall, wherein the positioning device is configured to manipulate the flexible wall into one or more rows;
a product picking device configured to engage with the plurality of storage units;
a platform on which the product picking device is at least partially disposed;
one or more totes disposed at least partially on the plurality of storage units; and
a conveying device configured to support the one or more totes, wherein the conveying device is integrated into the product picking device and is supported by the platform.

2. The fulfilment system of claim 1, wherein the one or more rows comprise an orientation selected from a group consisting of a straight angled line, a right angled line, an acute angled line, an obtuse angled line, and a simple curved line.

3. The fulfilment system of claim 1, wherein the positioning device is an autonomous mobile robot.

4. The fulfilment system of claim 1, wherein the positioning device is a first positioning device, wherein the fulfilment system further comprises a second positioning device, and
wherein the first positioning device is configured to engage the flexible wall at a first end of the flexible wall and the second positioning device is configured to engage the flexible wall at a second end of the flexible wall.

5. The fulfilment system of claim 1, wherein each storage unit of the plurality of storage units comprises a wheeled base.

6. The fulfilment system of claim 1, wherein each connection mechanism of the one or more connection mechanisms is selected from a group consisting of one or more hinged mechanism, one or more tensioned cables, one or more magnets, and one or more latches.

7. The fulfilment system of claim 1, wherein the one or more connection mechanisms are further configured to selectively lock the flexible wall into the one or more rows such that the flexible wall is a rigid wall when positioned into the one or more rows.

8. The fulfilment system of claim 1, wherein the flexible wall further comprises one or more handles, and wherein the positioning device is configured to engage with the one or more handles of the flexible wall.

9. The fulfilment system of claim 1, wherein the plurality of storage units comprise a plurality of rectangular put walls.

10. The fulfilment system of claim 1, wherein the product picking device has a range of motion comprising a spatial region from which the product picking device may engage with the plurality of storage units.

11. The fulfilment system of claim 1, wherein the platform comprises an actuating mechanism configured to raise and lower the product picking device relative to the flexible wall.

12. The fulfilment system of claim 1, further comprising a controller configured to communicate with one or more of the product picking device and the positioning device, and
wherein the controller is configured to send a signal to the positioning device to manipulate the flexible wall into the one or more rows such that the one or more rows conform to a spatial region of the product picking device.

13. The fulfilment system of claim 1, wherein the product picking device is a robotic arm configured for six-axis motion.

14. The fulfilment system of claim 13, wherein the robotic arm is configured to selectively move the one or more totes between the plurality of storage units and the platform.

15. A method of using a fulfilment system, the fulfilment system comprising:
a flexible wall comprising:
a plurality of storage units; and
one or more connection mechanisms configured to operably connect the plurality of storage units such that each storage unit of the plurality of storage units is configured to be positioned relative to at least one other storage unit of the plurality of storage units;
a positioning device operably connected to the flexible wall, wherein the positioning device is configured to manipulate the flexible wall into one or more rows;
a product picking device configured to engage with the plurality of storage units, wherein the product picking device has a range of motion comprising a spatial region from which the product picking device may engage with the plurality of storage units;
a platform on which the product picking device is at least partially disposed;

one or more totes disposed at least partially on the plurality of storage units; and a conveying device configured to support the one or more totes, wherein the conveying device is integrated into the product picking device and is supported by the platform, the method comprising:

manipulating, by the positioning device, the flexible wall into the one or more rows comprising one or more orientations conforming to the spatial region from which the product picking device may engage with the plurality of storage units.

16. The method of claim 15, further comprising:

removing, by the product picking device, the one or more totes from the plurality of storage units.

* * * * *